United States Patent [19]

Navidad

[11] 3,911,196

[45] Oct. 7, 1975

[54] MAGNETIC TAPE BINDER SYSTEM

[75] Inventor: Rodolfo Bautista Navidad, Redwood City, Calif.

[73] Assignee: Ampex Corporation, Redwood City, Calif.

[22] Filed: Sept. 30, 1974

[21] Appl. No.: 510,455

[52] U.S. Cl. ................. 428/425; 428/329; 428/403

[51] Int. Cl.[2] ............................................ B32B 5/16

[58] Field of Search ............ 161/162, 168; 117/235, 117/237, 238

[56] References Cited

UNITED STATES PATENTS 3,616,145 10/1971 Clifton ................................ 161/162

*Primary Examiner*—William J. Van Balen

[57] ABSTRACT

A binder for magnetic particles for a magnetic recording medium employs a combination of a polyurethane resin, a phenoxy resin and a vinylidine chloride-acrylonitrile resin. The binder system is particularly useful for a magnetic tape employed on a helical scan, video recorder.

4 Claims, No Drawings

MAGNETIC TAPE BINDER SYSTEM

SUMMARY OF THE INVENTION

The present invention relates to a novel binder system for use in magnetic recording media wherein a backing material which may be in the form of a tape, film, disc or the like, is provided with a novel combination of resin binder components with finely divided magnetic particles dispersed in the binder. Normally the backing material is a plastic although other non-magnetic materials such as paper, glass or metal can be used.

In order to secure good short wave length response in magnetic recording equipment such as in video recorders, computers, and high fidelity cassettes, it is highly desirable that the medium have a highly-polished, glossy surface. However, tapes with a highly-polished surface ordinarily exert a high degree of friction when passing through the tape transport; ordinarily the higher the surface gloss, the higher the frictional properties because of molecular contact. The problem is particularly severe in helical scan tape players wherein the tape passes around a stationary drum in a continuous motion while the head moves through a helical path in the drum. Glossy tapes tend to stick to the drum (commonly called "stiction") causing the tape to stop and start rather than making a smooth passage around the drum. Obviously, this degrades the video quality. The problem also exists with the usual broadcast video tape.

Lubricants have been tried as a solution to this problem but they are not satisfactory since lubricants cause some head separation and thus a loss of signal and also tend to collect on capstans, heads and the like and may result in premature failure of the equipment.

Another important property of helical scan tapes is freedom from wear since such tapes are frequently used in closed-circuit applications where the tape may be called upon to "still frame" and during still framing it can be subject to the equivalent of thousands of normal passes through the player in a matter of minutes.

In accordance with the present invention, a tape or similar recording medium is made which has a high surface gloss, yielding good short wave length response yet one which is extremely low in stiction or friction without the use of lubricants. The tape is extremely wear resistant so that it has a long still frame life.

In the past, it has been proposed to use various resin combinations such as combinations of vinylidine chloride-acrylonitrile resin with polyurethane resin, as well as phenoxy-polyurethane binder systems, but such systems have either poor tape wear or high stiction. With such tapes as used, it has been necessary to employ lubricants in an attempt to alleviate the problem, but such lubricants have the disadvantages enumerated above.

In accordance with the present invention, a novel tape binder is made which includes three different types of resins. By employing this novel system, a tape is made which has a high gloss with little stiction/friction, and which has long wearing properties. Because of the high gloss, the short wave length response is high. Furthermore, the tape has a long still frame time, making it very suitable for use with helical scan video recorders.

Thus, in accordance with the present invention, a tape binder is made which contains, on a resins solid basis, from 35–75% of a polyurethane resin, from 10–20% of a phenoxy resin, and from 15–45% of a vinylidine chloride-acrylonitrile resin, all parts being by weight. Preferably, the polyurethane component constitutes roughly 50% of the resin composition and the vinylidine chloride resin is used in excess of the phenoxy resin.

Typical polyurethane resins which are suitable for the purposes of the present invention are sold by B. F. Goodrich under the tradenames "Estane 5701" and "Estane 5714". These resins have the following characteristics:

| | Estane 5701 | Estane 5714 |
|---|---|---|
| Urethane Type | Poly(Ester-Urethane) | Poly(Ether-Urethane) |
| Specific Gravity | 1.2 | 1.11 |
| Hardness, Durometer A | 88 | 80 |
| Tensile Strength, psi | 5800 | 5000 |
| Modulus at 300% elongation, psi | 1300 | 1100 |
| Elongation, % | 500 | 600 |

Estane polyurethane resins are based on isocyanate-polyol reactions and contain no active or unreacted isocyanate.

The Estane 5714 polyether polymer is more flexible than the Estane 5701 and it is preferred for video products, e.g. broadcast video tape, that require good flexibility and good environment performance (this is due to the polyether linkage which is resistant to hydrolysis). For video products that require good tape wear and low coefficient of friction properties such as helical scan tapes, a combination of about equal parts of Estane 5701 and Estane 5714 together, or Estane 5701 alone, is preferred in the binder system.

A suitable phenoxy resin is sold by Carbide and Carbon Chemicals Co. under the tradename "PKHH". This resin has the following characteristics:

| | |
|---|---|
| Approximate Molecular Weight | 20,000 to 30,000 |
| Specific Gravity | 1.18 |
| Melt Flow (g/10 minutes at 220°C) | 2.5–10 |
| Ultimate Tensile Strength, psi | 9,000–9,500 |
| Ultimate Tensile Elongation, % | 50–100 |
| Softening Temperature | 100°C |
| Moisture Vapor Transmission | 3.5 gms/mil/24 hrs/100 in.$^2$ |
| Molecular Structure: | |

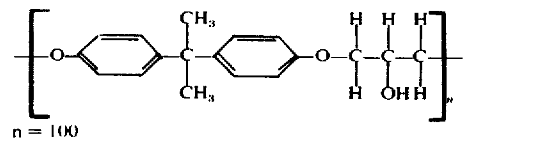

n = 100

The vinylidine chloride-acrylonitrile resin can suitably be Saran F-120 (Dow Chemical Corp.) and this resin has the following characteristics:

| | |
|---|---|
| Specific Gravity | 1.6 |
| Refractive Index | 1.580 |
| Tensile Strength (lb./sq.in.) | $9 \times 10^3$ |
| Percent Elongation | 8 – 10 |
| Viscosity (cps, 20% solution in MEK) | 1000 |
| Hardness (Sward Rocker) | 31 |
| Abrasion Resistance (Taber Abraser CS10 wheel under 1000 gm load, mil/1000 revs.) | 0.5 – 1.0 |
| Water Absorption of Film (2 weeks immersion of 1 mil film at 25°C) | 0.15% |
| Surface Resistivity (ohms per square) | $>10^3$ |

The Estane resins mentioned above are reactive polymers and in order to obtain a hard, highly abrasion resistant film, it is preferred that a polyisocyanate be added to the resin system. A suitable polyisocyanate is Mondur CB-75 sold by Mobay Chemical Company, and consists of a polyisocyanate solution in ethyl acetate having a solids content of about 74–76%. For each 10 parts of the other binder components, from 1 to 3 parts of the polyisocyanate may be used.

In order to make a tape, a dispersion solution is first prepared containing finely divided magnetic oxide particles such as gamma ferric oxide, carbon black, various additives in minor amounts and solvents. This mixture is ball milled for a time sufficient to form a smooth dispersion. A resin solution is made in a separate vessel containing the various resinous materials together with solvents and mixed to form a smooth solution. The resin solution and the dispersion are then mixed together and ball milled for a sufficient length of time to form a smooth dispersion of the magnetic and resinous materials. The thus finished coating dispersion is then coated on a plastic backing material, oriented and dried, all using techniques well known to those skilled in the art.

The following non-limiting examples illustrate preferred formulations made in accordance with the present invention.

Examples

| Dispersion | 1 | 2 (Parts by Weight) | 3 |
|---|---|---|---|
| Magnetic Oxide | 49.8 | 49.8 | 49.7 |
| Carbon Black | 3.6 | 4.1 | 4.1 |
| Additives * | 5.2 | 4.3 | 4.4 |
| Tetrahydrofuran | 11.2 | 36.8 | 36.8 |
| Cyclohexanone | 6.2 | 5.0 | 5.0 |
| Methyl Ethyl Ketone | 14.9 | | |
| Methyl Isobutyl Ketone | 9.1 | | |
| | 100.0 | 100.0 | 100.0 |
| Resin Solution to be added to above dispersion: | | | |
| Parts per hundred dispersion | 90.8 | 102.8 | 106.0 |
| Estane 5701 | 4.3 | 3.6 | |
| Estane 5714 | | 3.3 | 4.0 |
| Phenoxy PKHH | 1.7 | 1.0 | 1.7 |
| Saran F-120 | 3.4 | 2.7 | 3.9 |
| Mondur CB-75 | 2.7 | 1.2 | 2.0 |
| Additives * | 2.4 | 1.7 | 0.7 |
| Tetrahydrofuran | 46.7 | 53.2 | 54.3 |
| Cyclohexanone | 12.8 | 33.3 | 33.4 |
| Methyl Ethyl Ketone | 22.9 | | |
| Methyl Isobutyl Ketone | 3.1 | | |
| | 100.0 | 100.0 | 100.0 |
| Resin Viscosity at 70°F | 170cps | 280 cps | 250 cps |
| Mix Viscosity at 70°F | 2400 cps | 3000 cps | 2200 cps |

* additives include lecithin, silicon oil and phenyl mecuric oleate.

Tapes were made using the above formulations and tested and compared with well-known commercial tapes with the following results:

| Parameter | Video | Example 1 Helical Scan | Competition ¾" Sony Cassette |
|---|---|---|---|
| Layer-Layer adhesion test | | Passed | Passed |
| Resistivity (ohms per square) | | $2.9 \times 10^7$ | $3.2 \times 10^8$ |
| Stiction/Friction | | Low | Low |
| Still Frame | | 4 to 8 min. | — |
| Shed | | Low | Low |
| R.F. output (Ref - 100%) | | 102% | 92% |
| Video signal/noise ratio (db) (Rhode Schwarz) | | −0.3 | −0.3 |

| Parameter | Video | Example 2 Helical Scan (½" STD Energy) | Competition ½" 3M - 363 |
|---|---|---|---|
| Layer-Layer adhesion test | | Passed | Passed |
| Resistivity (ohms per square) | | $2.6 \times 10^8$ | $1.2 \times 10^8$ |
| Stiction/Friction | | Low | Low |
| Still Frame | | 20+ min. | 10+ min. |
| Shed | | Low | Low |
| R.F. output (Ref - 100%) | | 106% | 91% |
| Video signal/noise ratio (db) (Rhode Schwarz) | | −0.3 | −0.1 |
| Audio Level (db) | | +3.7 | +4.0 |
| Audio S/N (db) | | +3.4 | — |

| Parameter | Video | Example 3 Broadcast (2" Quad) | Competition 2" 3M - 400 |
|---|---|---|---|
| Layer-Layer adhesion test | | Passed | Passed |
| Resistivity (ohms per square) | | $1.3 \times 10^7$ | $2.5 \times 10^8$ |
| Stiction/Friction | | Low | Low |
| Shed | | Low | Low |
| Head wear at ambient condition (4"/hr.) 1200 passes | | Negligible | Negligible |
| R.F. output (Ref - 100%) | | 110% | 84% |
| Video signal/noise ratio (db) (Rhode Schwarz) | | 0 | +1 |
| Audio Level (db) | | 9.9 | 8.6 |
| Audio S/N (db) | | 53.4 | 59.6 |

I claim:

1. In a magnetic medium wherein the medium comprises a nonmagnetic substrate with a magnetic coating thereon, said coating comprising a dispersion of magnetic particles held in a resinous organic binder, the improvement comprising a binder containing from 35 to 75% of a polyurethane resin, from 10 to 20% of a phenoxy resin and from 15 to 45% of a vinylidine chloride-acrylonitrile resin, all percentages being by weight.

2. The medium of claim 1 wherein the binder contains about 50% of the polyurethane resin.

3. The medium of claim 1 wherein the polyurethane resin contains about equal parts of a polyester-urethane resin and a polyether-urethane resin.

4. The medium of claim 1 wherein the binder additionally contains a polyisocyanate in an amount of from 1 to 3 parts for each 10 parts of the other binder components.

* * * * *